US011766829B2

(12) United States Patent
Badesha et al.

(10) Patent No.: US 11,766,829 B2
(45) Date of Patent: Sep. 26, 2023

(54) SURFACE TREATED ADDITIVE MANUFACTURING PRINTHEAD NOZZLES AND METHODS FOR THE SAME

(71) Applicant: XEROX CORPORATION, Norwalk, CT (US)

(72) Inventors: Santokh S. Badesha, Pittsford, NY (US); Varun Sambhy, Pittsford, NY (US); Chu-Heng Liu, Penfield, NY (US); Peter M. Gulvin, Webster, NY (US); Mark A. Cellura, Webster, NY (US); George Shannon, Fairport, NY (US); Gary D. Redding, Dansville, NY (US); Lyle G. Dingman, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 49 days.

(21) Appl. No.: 17/017,392

(22) Filed: Sep. 10, 2020

(65) Prior Publication Data
US 2021/0069972 A1    Mar. 11, 2021

Related U.S. Application Data

(60) Provisional application No. 62/898,607, filed on Sep. 11, 2019.

(51) Int. Cl.
| | | |
|---|---|---|
| *C04B 41/00* | (2006.01) | |
| *C04B 41/45* | (2006.01) | |
| *C04B 41/88* | (2006.01) | |
| *B33Y 40/00* | (2020.01) | |
| *B29C 64/209* | (2017.01) | |
| *B29C 64/30* | (2017.01) | |
| *B33Y 99/00* | (2015.01) | |

(Continued)

(52) U.S. Cl.
CPC .......... *B29C 64/209* (2017.08); *B22D 23/003* (2013.01); *B22F 12/53* (2021.01);
(Continued)

(58) Field of Classification Search
CPC ... C04B 41/4586; C04B 41/459; C04B 41/88; B33Y 40/00; B33Y 40/10; B33Y 40/20; B33Y 10/00; B05D 3/002; B05D 3/102
See application file for complete search history.

(56) References Cited

U.S. PATENT DOCUMENTS

| | | |
|---|---|---|
| 6,682,181 B1 | 1/2004 | Moynihan et al. |
| 6,938,986 B2 | 12/2005 | Macler et al. |

(Continued)

FOREIGN PATENT DOCUMENTS

CN    108995204 A    12/2018

OTHER PUBLICATIONS

Simpson et al., "Superhydrophobic materials and coatings: a review," Reports on Progress in Physics, 78 (2015) 086501, 14 pages.

*Primary Examiner* — Michael P Wieczorek
(74) *Attorney, Agent, or Firm* — MH2 Technology Law Group LLP (57) ABSTRACT

Nozzles for an additive manufacturing device and methods for improving wettability of the nozzles are disclosed. The method may include subjecting the nozzle to a surface treatment. The surface treatment may include contacting a surface of the nozzle with one or more surface modifying agents. The surface modifying agents may include one or more of an oxidizing agent, an acid, a base, or combinations thereof. The one or more surface modifying agents may increase an oxygen content of the surface of the nozzle. An inner surface of the nozzle may have a water contact angle of greater than 1° and less than about 90°. The inner surface of the nozzle may be free or substantially free of a coating.

17 Claims, 3 Drawing Sheets

(51) Int. Cl.
  *B22D 23/00* (2006.01)
  *B22F 12/53* (2021.01)
  *B33Y 30/00* (2015.01)

(52) U.S. Cl.
  CPC .............. *B29C 64/30* (2017.08); *B33Y 99/00* (2014.12); *C04B 41/0054* (2013.01); *C04B 41/459* (2013.01); *C04B 41/4586* (2013.01); *C04B 41/88* (2013.01); *B33Y 30/00* (2014.12); *B33Y 40/00* (2014.12)

(56) References Cited

U.S. PATENT DOCUMENTS

| | | | |
|---|---|---|---|
| 8,474,141 B2 * | 7/2013 | Lim | G02F 1/1341 |
| | | | 29/890.142 |
| 8,575,384 B2 * | 11/2013 | Itoh | C07F 7/0836 |
| | | | 556/479 |
| 8,793,873 B2 | 8/2014 | Fielder et al. | |
| 9,616,494 B2 | 4/2017 | Vader et al. | |
| 10,040,119 B2 | 8/2018 | Vader et al. | |
| 2009/0102886 A1 | 4/2009 | Sieber et al. | |
| 2011/0298869 A1 | 12/2011 | Fielder et al. | |
| 2012/0237777 A1 * | 9/2012 | Lu | C09D 183/12 |
| | | | 427/535 |
| 2015/0140344 A1 * | 5/2015 | Ma | B32B 27/08 |
| | | | 428/447 |
| 2017/0056966 A1 | 3/2017 | Myerberg et al. | |
| 2017/0252823 A1 | 9/2017 | Sachs et al. | |
| 2017/0361501 A1 | 12/2017 | van der Zalm et al. | |
| 2019/0030602 A1 * | 1/2019 | Sachs | B33Y 70/00 |
| 2019/0077149 A1 * | 3/2019 | Nakayama | B41J 2/1628 |
| 2019/0118252 A1 | 4/2019 | Bauer et al. | |
| 2020/0031704 A1 | 1/2020 | Lee et al. | |

* cited by examiner

SURFACE TREATED ADDITIVE MANUFACTURING PRINTHEAD NOZZLES AND METHODS FOR THE SAME

CROSS-REFERENCE TO RELATED APPLICATIONS

This application claims priority to U.S. Provisional Patent Application No. 62/898,607, filed on Sep. 11, 2019, which is incorporated herein by reference to the extent consistent with the present disclosure.

TECHNICAL FIELD

The presently disclosed embodiments or implementations are directed to nozzles, such as nozzles for additive manufacturing devices or 3D printers, and methods for improving wetting or wettability of respective surfaces of the nozzles.

BACKGROUND

Magnetohydrodynamic (MHD) liquid metal jetting processes eject liquid or molten metal drops through a nozzle. To effectively facilitate the ejection of the liquid metal drops through the nozzle, it is necessary that the liquid metal sufficiently wets an inside surface of the nozzle. Conventional materials that may be used to fabricate the nozzles for MHD printheads, however, are not naturally wettable by liquid metal. Further, the materials utilized for the nozzles must be tolerable of relatively high temperatures, not very conductive, non-magnetic, and machinable. As such, ceramics or graphite are often utilized to fabricate the printhead housing and nozzles of MHD printheads. Ceramics and graphite, however, do not exhibit sufficient liquid metal wetting.

In view of the foregoing, conventional nozzles may often include a coating, such as a metallic wetting enhancement coating disposed along an inner surface thereof. For example, conventional nozzles may often include a nickel coating applied to the inner surface thereof via a vapor deposition or plating process. While the coating enhances liquid metal wetting along the inner surface of the nozzle, the coating also presents additional problems and challenges. For example, the coating may often interact with the liquid metal. In another example, the coating may introduce contamination that may eventually clog the nozzle.

What is needed, then, are improved nozzles and methods for improving wetting or wettability of the nozzles.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide a method for improving wettability of a nozzle for an additive manufacturing device. The method may include subjecting the nozzle to a surface treatment. The surface treatment may include contacting a surface of the nozzle with one or more surface modifying agents. The one or more surface modifying agents may increase an oxygen content of the surface of the nozzle.

In some examples, contacting the surface of the nozzle with the one or more surface modifying agents may include contacting an inner surface of the nozzle with the one or more surface modifying agents.

In some examples, contacting the surface of the nozzle with the one or more surface modifying agents may include contacting an inner surface and an outer surface of the nozzle with the one or more surface modifying agents.

In some examples, the surface of the nozzle is contacted with the one or more surface modifying agents for a period of time of from about 1 min to about 60 min.

In some examples, the surface modifying agents may include one or more of an oxidizing agent, an acid, a base, or combinations thereof.

In some examples, the surface modifying agents may include the oxidizing agent.

In some examples, the surface modifying agents may include the oxidizing agent and may further include the acid or the base.

In some examples, the surface modifying agents may include the oxidizing agent and the acid. The oxidizing agent may include hydrogen peroxide and the acid may include concentrated sulfuric acid. The concentrated sulfuric acid and the hydrogen peroxide may be present in a volume ratio of from about 2:1 to about 4:1.

In some examples, the surface modifying agents may include the oxidizing agent. The oxidizing agent may include one or more of hydrogen peroxide, a hypochlorite, sodium hypochlorite, inorganic chlorite, chlorate, perchlorate, nitrous oxide ($N_2O$), nitrogen dioxide/dinitrogen tetroxide ($NO_2/N_2O_4$), sulfur dioxide ($SO_2$), inorganic peroxides, Fenton's reagent, inorganic nitrates, hexavalent chromium compounds, permanganate compounds, sodium perborate, cerium (IV) compounds, sodium bismuthate, fluorine ($F_2$), chlorine ($Cl_2$), bromine ($Br_2$), ruthenium tetroxide ($RuO_4$), osmium tetroxide ($OsO_4$), Tl (III) thallic compounds, or the like, or mixtures or combinations thereof.

In some examples, the surface modifying agents may include the acid. The acid may include one or more of sulfuric acid, hydrochloric acid, nitric acid, peroxymonosulfuric acid, peroxydisulfuric acid, acetic acid, or the like, or any combination thereof.

In some examples, the acid may include concentrated nitric acid and concentrated hydrochloric acid in a volume ratio of from about 1:3 to about 1:5.

In some examples, the surface modifying agents may include the base. The base may include one or more of a metal hydroxide, ammonia, ammonium hydroxide, or combinations thereof. Optionally, the metal hydroxide may include one or more of sodium hydroxide, potassium hydroxide, calcium hydroxide, or combinations thereof.

In some examples, the method may further include rinsing the nozzle with the aqueous solution.

In some examples, the method may further include drying the nozzle after rinsing. Drying the nozzle may include heating the nozzle.

In some examples, the method may further include subjecting the nozzle to a post-treatment process to preserve the increased oxygen content of the surface of the nozzle. The post-treatment process may include contacting the surface of the nozzle with an intermediate sacrificial material.

In some examples, the post-treatment process may further include cooling the nozzle with the intermediate sacrificial material contacting the surface of the nozzle.

In some examples, the method does not include depositing a coating on the substrate of the nozzle.

The present disclosure may provide a nozzle for additive manufacturing. The nozzle may include a body having an inner surface and an outer surface. The inner surface may define an inner volume of the nozzle. The inner surface of the nozzle may include a water contact angle of greater than 1° and less than about 90°.

The present disclosure may provide a nozzle for additive manufacturing. The nozzle may include a body having an inner and an outer surface. The inner surface may define an inner volume of the nozzle. The inner surface of the nozzle may be subjected to a surface treatment such that the inner surface may include a relatively greater oxygen content as compared to an untreated surface of the nozzle.

In some examples, a coating is not disposed on the inner surface and the outer surface of the nozzle.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure is directed to nozzles, such as nozzles for additive manufacturing devices or 3D printers, and methods for improving wetting or wettability of respective surfaces (e.g., inner and/or outer surfaces) of the nozzles. As used herein, the term "wettability" or the like may refer to the ability of a liquid to maintain contact with a solid surface, resulting from intermolecular interactions when the liquid and the solid are brought together or contacted with one another. A degree of wetting or wettability may be determined by a force balance between adhesive and cohesive forces. Adhesive forces between the liquid and the solid may cause a liquid drop to spread across the surface. Cohesive forces within the liquid may cause the drop to "ball up" and avoid contact with the surface. A relatively higher wettability of a surface towards a specific liquid implies that the specific liquid will spread to a higher degree across the solid surface. As further described herein, the methods may include exposing or subjecting respective surfaces of the nozzles to one or more surface treatments to thereby modify (e.g., chemically modify) the respective surfaces of the nozzles. The surface treatments may directly modify the respective surfaces of the nozzles, and thereby improve wettability of the respective surfaces without a coating.

Figure 1A:
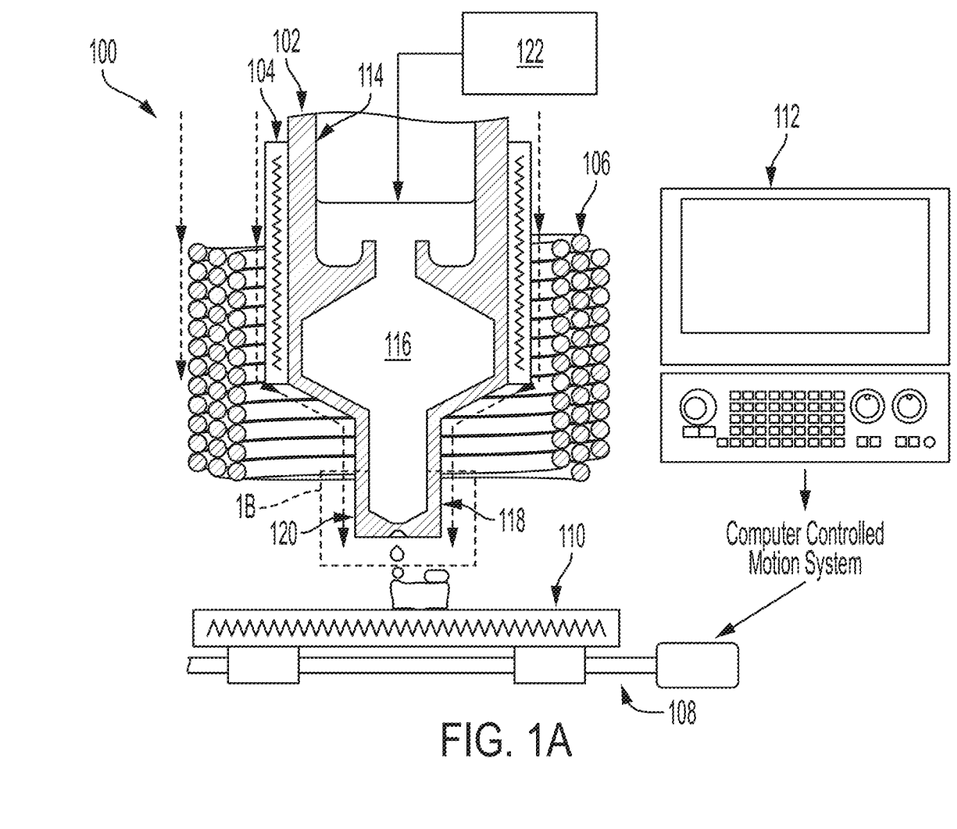
FIG. 1A illustrates a schematic cross-sectional view of an exemplary 3D printer, according to one or more embodiments disclosed.
Figure 1B:
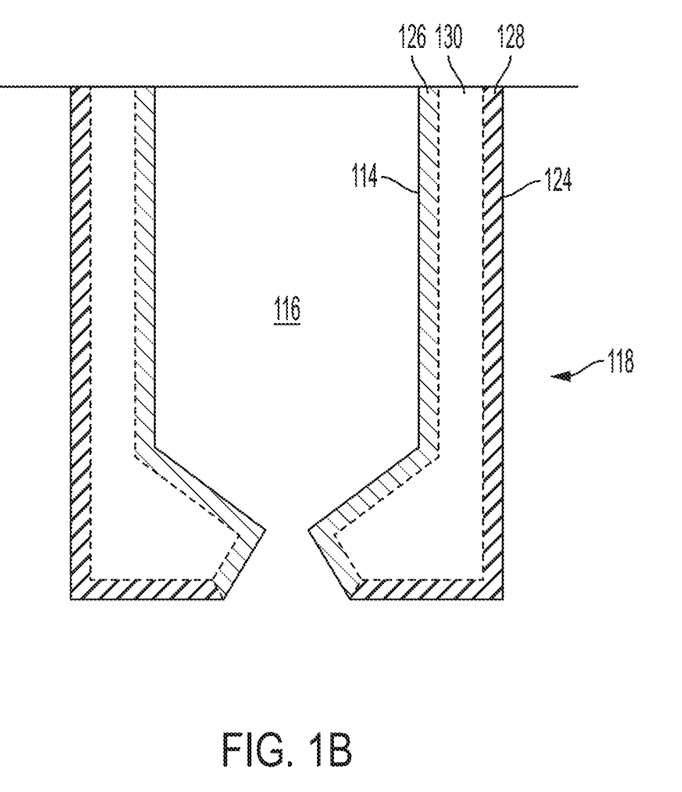
FIG. 1B illustrates an enlarged view of the nozzle of the 3D printer indicated by the box labeled "1B" of FIG. 1A, according to one or more embodiments disclosed.

FIG. 1A illustrates a schematic cross-sectional view of an exemplary additive manufacturing layering device or 3D printer 100 that may utilize the nozzles disclosed herein, according to one or more embodiments. The 3D printer 100 may be a magnetohydrodynamic (MHD) printer. It should be appreciated, however, that any additive manufacturing device may utilize the nozzles and methods disclosed herein. The 3D printer 100 may include a body 102, which may also be referred to herein as a pump chamber, one or more heating elements (one is shown 104), one or more metallic coils 106, a stage 108, a substrate 110, a computing system 112, or any combination thereof, operably coupled with one another. As illustrated in FIG. 1A, the heating elements 104 may be at least partially disposed about the body 102, and the metallic coils 106 may be at least partially disposed about the body 102 and/or the heating elements 104. As further illustrated in FIG. 1A, the substrate 110 may be disposed on the stage 108 and below the body 102. The body 102 may include an inner surface 114 defining an inner volume 116 thereof. The body 102 may define a nozzle 118 disposed at a first end portion 120 thereof. FIG. 1B illustrates an enlarged view of the nozzle 118 of the 3D printer 100, indicated by the box labeled "1B" of FIG. 1A, according to one or more embodiments.

In an exemplary operation of the 3D printer 100 with continued reference to FIGS. 1A and 1B, a build material (e.g., metal) from a source 122 may be directed to the inner volume 116 of the body 102. The heating elements 104 may at least partially melt the build material contained in the inner volume 116 of the body 102. For example, the build material may be a solid, such as a solid metal, and the heating elements 104 may heat the body 102 and thereby heat the build material from a solid to a liquid (e.g., molten metal). The metallic coils 106 may be coupled with a power source (not shown) capable of or configured to facilitate the deposition of the build material on the substrate 110. For example, the metallic coils 106 and the power source coupled therewith may be capable of or configured to generate a magnetic field, which may generate an electromotive force within the body 102, thereby generating an induced electrical current in the molten metal disposed in the body 102. The magnetic field and the induced electrical current in the molten metal may create a radially inward force on the liquid metal, known as a Lorenz force, which creates a pressure at the nozzle 118. The pressure at the nozzle 118 may expel the molten metal out of the nozzle 118 toward the substrate 110 and/or the stage 108 in the form of one or more drops.

Referring back to FIG. 1B, the nozzle 118 may include or be fabricated from one or more ceramic and/or graphitic materials. Illustrative ceramic and/or graphitic materials may be or include, but are not limited to, graphite, boron nitride, silicon nitride, aluminum nitride, aluminum oxide, composites thereof, or combinations thereof.

In at least one embodiment, a portion 126 of the inner surface 114 and/or a portion 128 of an outer surface 124 of the body 102 or the nozzle 118 thereof may be modified. For example, as further described herein, the inner and/or outer surfaces 114, 124 of the body 102 or the nozzle 118 thereof may be exposed to one or more surface treatments or surface treatment processes to thereby modify respective portions 126, 128 of the body 102 or the nozzle 118 thereof. As used herein, the expressions "surface treatment" or "surface treatment process" may refer to a process that will modify (e.g., chemically modify) a surface to improve the direct wetting interaction or wettability between the modified surface and a liquid or a build material (e.g., molten metal). Accordingly, in at least one embodiment, the respective portions 126, 128 of the inner and outer surfaces 114, 124 may be chemically different than remaining portions 130 of the nozzle 118 not exposed to the one or more surface treatments.

In at least one embodiment, the one or more surface treatments may include contacting the inner and/or outer surfaces 114, 124 of the nozzle 118 with one or more surface modifying agents. For example, the one or more surface treatments or methods for treating the nozzle 118 may include at least partially filling the inner volume 116 of the nozzle 118 with the one or more surface modifying agents such that the surface modifying agents contact the inner surface 114 of the nozzle 118. In another example, the one or more surface treatments or methods for treating the nozzle 118 may include at least partially immersing the nozzle 118 in the one or more surface modifying agents such that the surface modifying agents contact the inner and outer surfaces 114, 124 of the nozzle 118.

The inner and/or outer surfaces 114, 124 of the nozzle 118 may be contacted with the one or more surface modifying agents for an amount of time sufficient to substantially or completely modify the respective surfaces 114, 124 or the respective portions 126, 128 of the nozzle 118. In at least one embodiment, the inner and/or outer surfaces 114, 124 of the nozzle 118 may be contacted with the one or more surface modifying agents for a period of from about 1 min to about 60 min. For example, the inner and/or outer surfaces 114, 124 of the nozzle 118 may be contacted with the one or more surface modifying agents for a period of from about 1 min, about 5 min, about 10 min, about 15 min, about 20 min, about 30 min, about 40 min, about 50 min, or about 55 min to about 60 min. In another example, the inner and/or outer surfaces 114, 124 of the nozzle 118 may be contacted with the one or more surface modifying agents for a period of from about 1 min to about 5 min, about 10 min, about 15 min, about 20 min, about 30 min, about 40 min, about 50 min, about 55 min, or about 60 min. In yet another example, the inner and/or outer surfaces 114, 124 of the nozzle 118 may be contacted with the one or more surface modifying agents for a period of from about 1 min, about 5 min, about 10 min, about 15 min, about 20 min, or about 30 min to about 40 min, about 50 min, about 55 min, or about 60 min.

After contacting the nozzle 118 with the one or more surface modifying agents, the nozzle 118 may be rinsed with water or an appropriate solution, such as an aqueous solution. For example, after contacting the nozzle 118 with the one or more surface modifying agents, the nozzle 118 may be rinsed under running water and/or immersed in a container with water. The nozzle 118 may be immersed in water for up to 24 hours. In at least one embodiment, the water in the container may be replaced every 1 to 5 hours or every 2 to 3 hours.

After rinsing the nozzle 118 with water or an appropriate solution, the nozzle 118 may be dried. In at least one embodiment, the nozzle 118 may be air dried. For example, the nozzle 118 may be exposed to atmospheric conditions. In another example, the nozzle 118 may be dried with compressed air. In yet another example, the nozzle 118 may be dried via heating. For example, the nozzle 118 may be dried in an oven maintained at a temperature sufficient to dry the nozzle 118 (e.g., greater than about 80° C., greater than about 100° C., greater than about 120° C., etc.). The nozzle 118 may be dried for an amount of time sufficient to evaporate or remove the water contained in the inner volume 116 of the nozzle 118, on the inner surface 114 of the nozzle 118, on the outer surface 124 of the nozzle 118, or combinations thereof.

The one or more surface modifying agents may be or include, but are not limited to, one or more oxidizing agents, one or more acids, one or more bases, or combinations thereof. In at least one example, the one or more surface treatments may include contacting the inner and/or outer surfaces 114, 124 of the nozzle 118 with only one or more oxidizing agents. In another example, the one or more surface treatments may include contacting the inner and/or outer surfaces 114, 124 of the nozzle 118 with the one or more oxidizing agents and an additional surface modifying agent, such as one or more of the acids and/or the bases. The inner and outer surfaces 114, 124 of the nozzle 118 may be contacted with the one or more surface modifying agents in any order. For example, the nozzle 118 may be contacted with the one or more oxidizing agents and subsequently contacted with the one or more acids and/or the one or more bases. In another example, the nozzle 118 may be concurrently contacted with a combination of the one or more oxidizing agents, the acids, and/or the bases. It should be appreciated that the nozzle 118 may be rinsed with water or an appropriate solution, as described above, before and/or after a first surface treatment and/or after any subsequent surface treatments. For example, the nozzle 118 may be first treated with the oxidizing agent, then rinsed with water, and subsequently treated with the acid and/or the base.

Illustrative oxidizing agents may be or include, but are not limited to, any one or more of hydrogen peroxide, bleach (e.g., hypochlorites, such as calcium hypochlorite; peroxides, such as hydrogen peroxide, sodium percarbonate, sodium perborate; or the like), sodium hypochlorite, inorganic chlorite, chlorate, perchlorate, nitrous oxide ($N_2O$), nitrogen dioxide/dinitrogen tetroxide ($NO_2/N_2O_4$), sulfur dioxide ($SO_2$), inorganic peroxides, Fenton's reagent (i.e., solution of hydrogen peroxide and ferrous iron), inorganic nitrates, hexavalent chromium compounds, such as chromium trioxide, chromate, and dichromate, permanganate compounds, such as potassium permanganate, sodium perborate, cerium (IV) compounds, such as ceric ammonium nitrate and ceric sulfate, sodium bismuthate, fluorine ($F_2$), chlorine ($Cl_2$), bromine ($Br_2$), ruthenium tetroxide ($RuO_4$), osmium tetroxide ($OsO_4$); Tl (III) thallic compounds, or the like, or mixtures or combinations thereof. It should be appreciated that the oxidizing agent may also be an acid. Illustrative oxidizing agents that may also be an acid include, but are not limited to, sulfuric acid, hydrochloric acid, nitric acid, peroxymonosulfuric acid, peroxydisulfuric acid, or the like, or any combination thereof.

Illustrative acids may be or include, but are not limited to, any one or more of sulfuric acid, hydrochloric acid, nitric acid, peroxy mono and di sulfuric acid, acetic acid, any Arrhenius, Brønsted-Lowry or Lewis acids known in the art, or the like, or any combination thereof.

Illustrative bases may be or include, but are not limited to, any one or more of metal hydroxides, such as sodium hydroxides, potassium hydroxides, calcium hydroxides, ammonia, ammonium hydroxide, any Arrhenius, Brønsted-Lowry or Lewis bases known in the art, or the like, or any combination thereof.

In an exemplary embodiment, the surface modifying agents may include nitric acid. In another exemplary embodiment, the surface modifying agents may include a combination of two or more acids, such as concentrated nitric acid and concentrated hydrochloric acid. For example, the surface modifying agents may include aqua regia, which is a combination of concentrated nitric acid and concentrated hydrochloric acid in a volume ratio of from about 1:3 to about 1:5, or about 1:4. In yet another exemplary embodiment, the surface modifying agents may include a combination of an oxidizing agent and an acid. For example, the surface modifying agents may include a piranha solution, which is a combination or mixture of concentrated sulfuric acid and hydrogen peroxide in a volume ratio of from about 2:1 to about 4:1, or about 3:1. It should be appreciated that the volume ratio of the concentrated sulfuric acid and hydrogen peroxide (e.g., 30% hydrogen peroxide) may be from about 1:50 to about 50:1.

In an exemplary embodiment, the nozzle 118 may be fabricated from graphite, and the surface modifying agents may include an oxidizing agent capable of or configured to oxidize the C=C double bonds of the inner and/or outer surfaces 114, 124 to C—C single bonds and thereby form one or more of a carbonyl functionality (C=O), a hydroxyl functionality (C—OH), a carboxyl functionality (—COOH), or combinations thereof. It should be appreciated that the oxidation of the inner and/or outer surfaces 114, 124 of the graphite nozzle 118 may be indicated by an increase in oxygen content at the respective inner and/or outer surfaces 114, 124. The increase in the oxygen content at the inner and/or outer surfaces 114, 124 may be measured or evaluated by X-ray photoelectron spectroscopy (XPS), Fourier-transform infrared spectroscopy (FTIR), Raman spectroscopy, solid state Nuclear Magnetic Resonance (NMR), or any suitable technique, such as a technique that may detect C—O bonds.

The respective portions 126, 128 of the nozzle 118 that are modified with the surface treatment may have a thickness of from about 1 Angstrom (Å) to about 500 Å. For example, the respective portions 126, 128 of the nozzle 118 that are modified with the surface treatment may have a thickness of from about 1 Å, about 5 Å, about 10 Å, about 50 Å, about 100 Å, or about 150 Å to about 200 Å, about 250 Å, about 300 Å, about 350 Å, about 400 Å, or about 500 Å. In another example, the respective portions 126, 128 of the nozzle 118 that are modified with the surface treatment may have a thickness of greater than 1 Å and less than or equal to 500 Å, less than or equal to 400 Å, less than or equal to 300 Å, less than or equal to 200 Å, less than or equal to 100 Å, less than or equal to 50 Å, or less than or equal to 10 Å. In yet another example, the respective portions 126, 128 of the nozzle 118 that are modified with the surface treatment may have a thickness of from about 1 Å to about 500 Å, about 100 Å to about 400 Å, or about 200 Å to about 300 Å. It should be appreciated that the thickness of the respective portions 126, 128 are significantly thinner than a coating, such as a coating prepared from electroless plating (e.g., nickel coating), which may have a thickness of from about 1 µm to about 100 µm, more typically from about 10 µm to about 25 µm.

As used herein, the expression "water contact angle" may refer to the angle that deionized water or a test liquid contacts a surface. The water contact angle may be measured with any suitable goniometer. The inner surface 114 and/or the outer surface 124 of the nozzles 118 that are modified via the surface treatment may have a water contact angle of greater than 1° and less than about 90°, less than about 50°, less than about 40°, less than about 30°, less than about 25°, less than about 20°, less than about 15°, or less than about 10°. In another example, the inner surface 114 and/or the outer surface 124 of the nozzles 118 that are modified via the surface treatment may have a water contact angle of from about 1° to about 90°, about 5° to about 80°, about 10° to about 70°, about 15° to about 60°, about 20° to about 50°, or about 20° to about 40°. Illustrative test liquids may be or include, but are not limited to, water, ethylene glycol, diiodomethane, or the like, or combinations thereof.

In at least one embodiment, the inner surface 114 and/or the outer surface 124 of the nozzles 118 that are modified via the surface treatment may have a relatively smoother surface (e.g., less roughness) as compared to an untreated surface.

In at least one embodiment, the surface treated inner and/or outer surfaces 114, 124 and/or the modified portions 126, 128 of the nozzle 118 may be exposed or subjected to a subsequent or post-treatment process capable of or configured to at least partially protect or maintain the surface treated properties of the modified inner and/or outer surfaces 114, 124 and/or the modified portions 126, 128 of the nozzle 118. For example, the surface treated inner and/or outer surfaces 114, 124 and/or the modified portions 126, 128 may exhibit gradual losses of the functionality when exposed to atmospheric conditions. As such, the inner and/or outer surfaces 114, 124 and/or the modified portions 126, 128 may be subjected to a subsequent process that may at least partially halt, reduce, or otherwise slow the loss of functionality, thereby at least partially preserving the functionality.

In at least one embodiment, the post-treatment process may include contacting the inner and/or outer surfaces 114, 124 and/or the modified portions 126, 128 with an intermediate sacrificial material. The inner and/or outer surfaces 114, 124 and/or the modified portions 126, 128 of the nozzle 118 may be contacted with the intermediate sacrificial material immediately after the surface treatment, or shortly thereafter. For example, the respective surfaces 114, 124 and/or the modified portions 126, 128 may be contacted with the intermediate sacrificial material within about 2 hours of the surface treatment (e.g., about 0 hours to about 2 hours). In at least one embodiment, the post-treatment process may also include draining the intermediate sacrificial material from the nozzle 118. The post-treatment process may also include subsequently cooling the nozzle 118 for storage. In some examples, the intermediate sacrificial material may not be drained from the nozzle 118 prior to cooling. As such, the nozzle 118 may be cooled with the intermediate sacrificial material disposed in the inner volume 116 and/or with the intermediate sacrificial material contacting the inner and/or outer surfaces 114, 124.

The intermediate sacrificial material may have thermal expansion properties similar or substantially similar to the nozzle 118 to thereby maintain structural integrity (e.g., reduce cracking) of the nozzle 118 while cooling the nozzle 118. For example, the intermediate sacrificial material may have similar thermal expansion properties to the nozzle 118 at a temperature of from about room temperature to a melting point of the intermediate sacrificial material.

The intermediate sacrificial material may have a relatively low melting point to thereby introduce less thermal stress, and enable displacement by a molten build material or a primary jetting metal during printing. The melting point of the intermediate sacrificial material may be substantially equal to or less than an operating temperature or melting temperature of the build material. For example, the melting point of the intermediate sacrificial material may be from about 400° C., about 450° C., about 500° C., or about 560° C. to about 660° C., about 700° C., about 750° C., about 800° C., about 900° C., about 1000° C., about 1100° C., about 1200° C., about 1400° C., or about 1500° C.

The intermediate sacrificial material may be compatible with the build material or the primary jetting metal. For example, the intermediate sacrificial material may at least partially dissolve or combine with the molten build material during jetting, thereby replacing or removing the intermediate sacrificial material from the nozzle 118 during printing or jetting. It should be appreciated that the intermediate sacrificial material introduced into the nozzle 118 does not form a coating during normal printing operations or processes. For example, during a printing process the molten build material flowing through the nozzle 118 will displace, eject, or otherwise remove the intermediate sacrificial material from the nozzle 118.

The intermediate sacrificial material may be or include one or more metals, metal alloys, or combinations thereof. Illustrative metals and metal alloys that may be utilized for the intermediate sacrificial material may be or include, but are not limited to, the build material intended to be utilized in the 3D printer 100, aluminum, one or more soldering alloys, metals having a melting point of from about 500° C. to about 700° C., about 560° C. to about 660° C., or lower, or the like, or any combination thereof.

As used herein, the term or expression "coating" may refer to a physical barrier that separates an original or native surface of the nozzle 118 from a build material (e.g., molten metal) flowing through and/or contained in the nozzle 118. For example, a coating may refer to a material deposited (e.g., post-fabrication of the nozzle 118) on the inner and/or outer surfaces 114, 124 of the nozzle 118 to separate the inner and/or outer surfaces 114, 124 of the nozzle 118 from the molten metal flowing through and/or contained in the inner volume 116 of the nozzle 118. A coating may result in the formation of two interfaces or surface interfaces. For example, a coating may create an interface between inner and/or outer surfaces 114, 124 of the nozzle 118 and the coating. In another example, the coating may create an interface between the coating and the molten metal flowing through and/or contained in the nozzle 118. As noted above, coatings may generally have a thickness of from about 1 μm to about 100 μm, or more typically from about 10 μm to about 25 μm. Coatings may be deposited via various processes/techniques, such as sputtering, evaporation, electroplating, electroless plating, or the like, or any combination thereof. In at least one embodiment, the nozzle 118 disclosed herein may not include a coating. For example, the nozzle 118 and the inner and/or outer surfaces 114, 124 thereof may be free or substantially free of a coating. Accordingly, the inner and/or outer surfaces 114, 124 and/or the respective modified portions 126, 128 of the nozzle 118 may directly contact the melted build material (e.g., molten metal) flowing through or contained in the nozzle 118

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

An exemplary nozzle was subjected to a surface treatment and evaluated for jetting stability and contamination or occlusion growth. Particularly, a graphite nozzle was treated with a solution of concentrated sulfuric acid and 30% hydrogen peroxide in a vol/vol ratio of about 4:1 for about 5 min. After treatment, the nozzle was washed with distilled water and dried in an oven maintained at about 120° C. for about 60 minutes. After drying, the nozzle was utilized in a 3D printed and tested for jetting stability and contamination or occlusion growth. A conventional nozzle including a nickel coating was utilized as a control. The results are summarized in FIGS. 2 and 3.

Figure 2:
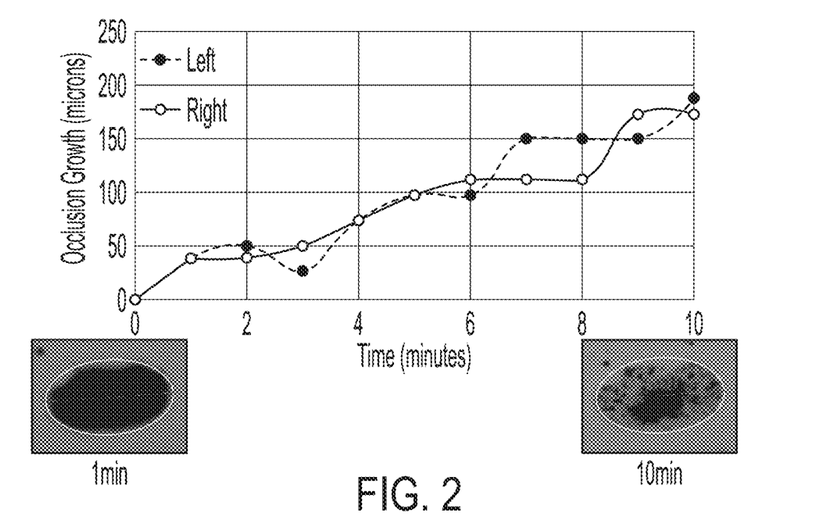
FIG. 2 is a plot illustrating the growth of occlusions in the control nozzle of Example 1.
Figure 3:
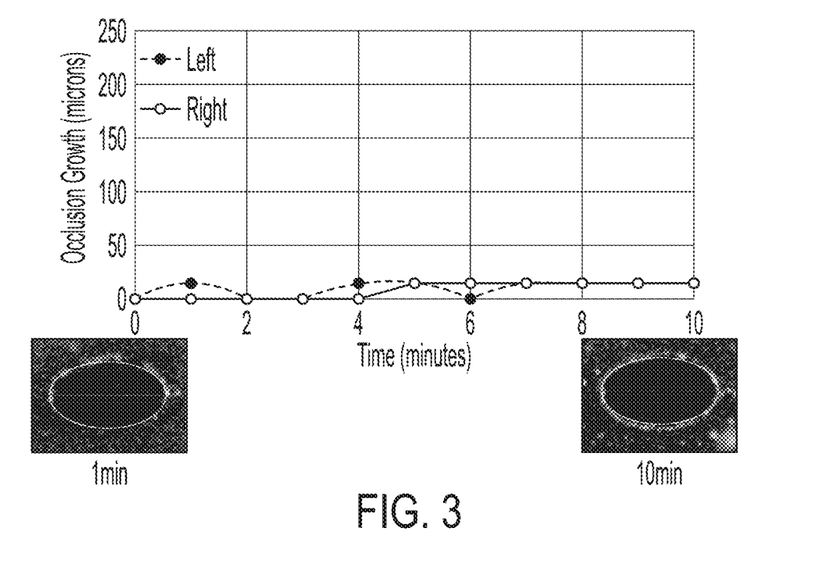
FIG. 3 is a plot illustrating the growth of occlusions in the test nozzle of Example 1.

As illustrated in FIG. 2, the control or untreated nozzle exhibited significant occlusion growth, which increased gradually over a period of about 10 minutes. Conversely, the treated nozzle showed significantly lower occlusion growth when compared to the control nozzle. The occlusions in the surface treated nozzle appeared to maintain the same size or increased only slightly over a period of about 10 minutes.

It was observed that as the occlusions grew in the control/untreated nozzle, the drops of the molten build material or molten metal would be significantly off-axis, the speed of the drops were inconsistent (e.g., increase or decrease), and the stability of the speed progressively worsened.

Example 2

Surface analysis of the exemplary nozzle prepared in Example 1 was conducted. Particularly, X-ray photoelectron spectroscopy (XPS) analysis of the nozzle from Example 1 was conducted. The treated and untreated samples were analyzed for atomic percentages using depth profiling sputter mode XPS. In this method, an Argon ion beam was used to ablate the target surface and atomic % measurements were done at specific time intervals. This method gives a sense of the depth of the treatment and chemical composition of the surface as one goes deeper into it. A longer sputter time implied that more of the sample was ablated and the measurement was being collected from a deeper portion of the sample. Sputter experiments were done with 3 keV, 7 mA Argon ion beam with a sputter rate of 1.4 nm/min. The results are summarized in Table 1.

TABLE 1

XPS of Control and Test Nozzle

| Sputter Time (min) | C (at %) | O (at %) | Si (at %) | S (at %) |
|---|---|---|---|---|
| Control Nozzle | | | | |
| 0 | 95.98 | 3.76 | 0 | 0.27 |
| 2 | 98.75 | 0.91 | 0 | 0.35 |
| 4 | 98.94 | 0.78 | 0 | 0.28 |
| 6 | 99.25 | 0.45 | 0 | 0.31 |
| Test Nozzle | | | | |
| 0 | 87.35 | 10.76 | 0 | 1.9 |
| 1 | 89.97 | 8 | 0 | 2.03 |
| 2 | 89.78 | 8.1 | 0 | 2.12 |
| 4 | 88.93 | 8.83 | 0 | 2.23 |
| 8 | 89.27 | 8.35 | 0 | 2.38 |
| 16 | 89.8 | 7.98 | 0 | 2.22 |
| 32 | 90.56 | 7.35 | 0 | 2.09 |
| 48 | 90.73 | 7.17 | 0 | 2.09 |
| 80 | 91.54 | 6.54 | 0 | 1.92 |

As indicated in Table 1, a significantly higher atomic percentage of oxygen was measured in the test nozzle, treated with the solution of concentrated sulfuric acid and 30% hydrogen peroxide, as compared to the control or untreated nozzle. As such, it was demonstrated that the test nozzle exhibited significantly higher oxidation of the graphite surface than the control nozzle, which resulted in relatively greater metal wettability.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A method for modifying wettability of a nozzle for an additive manufacturing device, the method comprising subjecting the nozzle to a surface treatment, wherein the surface treatment comprises contacting a surface of the nozzle with one or more surface modifying agents, wherein the one or more surface modifying agents increase an oxygen content of the surface of the nozzle, wherein the nozzle is fabricated from one or more graphitic materials, and wherein the surface modifying agents comprises one or more of an oxidizing agent, an acid, a base, or a combination thereof.

2. The method of claim 1, wherein contacting the surface of the nozzle with the one or more surface modifying agents comprises contacting an inner surface of the nozzle with the one or more surface modifying agents.

3. The method of claim 1, wherein contacting the surface of the nozzle with the one or more surface modifying agents comprises contacting an inner surface and an outer surface of the nozzle with the one or more surface modifying agents.

4. The method of claim 1, wherein the surface of the nozzle is contacted with the one or more surface modifying agents for a period of time of from about 1 min to about 60 min.

5. The method of claim 1, wherein the surface modifying agents comprise the oxidizing agent.

6. The method of claim 5, wherein the surface modifying agents further comprise the acid or the base.

7. The method of claim 6, wherein the surface modifying agents comprise the oxidizing agent and the acid, wherein the oxidizing agent comprises hydrogen peroxide and the acid comprises concentrated sulfuric acid, wherein the concentrated sulfuric acid and the hydrogen peroxide are present in a volume ratio of from about 2:1 to about 4:1.

8. The method of claim 1, wherein the surface modifying agents comprise the oxidizing agent, and wherein the oxidizing agent comprises one or more of hydrogen peroxide, a hypochlorite, sodium hypochlorite, inorganic chlorite, chlorate, perchlorate, nitrous oxide ($N_2O$), nitrogen dioxide/dinitrogen tetroxide ($NO_2/N_2O_4$), sulfur dioxide ($SO_2$), inorganic peroxides, Fenton's reagent, inorganic nitrates, hexavalent chromium compounds, permanganate compounds, sodium perborate, cerium (IV) compounds, sodium bismuthate, fluorine ($F_2$), chlorine ($Cl_2$), bromine ($Br_2$), ruthenium tetroxide ($RuO_4$), osmium tetroxide ($OsO_4$), Tl (III) thallic compounds, or the like, or mixtures or combinations thereof.

9. The method of claim 1, wherein the surface modifying agents comprise the acid, and wherein the acid comprises one or more of sulfuric acid, hydrochloric acid, nitric acid, peroxymonosulfuric acid, peroxydisulfuric acid, acetic acid, or the like, or any combination thereof.

10. The method of claim 9, wherein the acid comprises concentrated nitric acid and concentrated hydrochloric acid in a volume ratio of from about 1:3 to about 1:5.

11. The method of claim 1, wherein the surface modifying agents comprise the base, and wherein the base comprises one or more of a metal hydroxide, ammonia, ammonium hydroxide, or combinations thereof, optionally, the metal hydroxide comprises one or more of sodium hydroxide, potassium hydroxide, calcium hydroxide, or combinations thereof.

12. The method of claim 1, further comprising rinsing the nozzle with an aqueous solution.

13. The method of claim 12, further comprising drying the nozzle after rinsing, wherein drying the nozzle comprises heating the nozzle.

14. The method of claim 1, further comprising subjecting the nozzle to a post-treatment process to preserve the increased oxygen content of the surface of the nozzle, wherein the post-treatment process comprises contacting the surface of the nozzle with an intermediate sacrificial material.

15. The method of claim 14, wherein the post-treatment process further comprises cooling the nozzle with the intermediate sacrificial material contacting the surface of the nozzle.

16. The method of claim 1, wherein the method does not comprise depositing a coating on the surface of the nozzle.

17. The method of claim 1, wherein the nozzle is fabricated from graphite.

* * * * *